(12) United States Patent
Lemarenko et al.

(10) Patent No.: US 10,345,465 B2
(45) Date of Patent: Jul. 9, 2019

(54) RESONANCE-BASED INVERSION OF ACOUSTIC IMPEDANCE OF ANNULUS BEHIND CASING

(71) Applicant: Schlumberger Technology Corporation, Sugar Land, TX (US)

(72) Inventors: Mikhail Lemarenko, Clamart (FR); Christoph Klieber, Clamart (FR); Sylvain Thierry, Clamart (FR); Sandip Bose, Chestnut Hill, MA (US); Smaine Zeroug, Lexington, MA (US)

(73) Assignee: SCHLUMBERGER TECHNOLOGY CORPORATION, Sugar Land, TX (US)

( * ) Notice: Subject to any disclaimer, the term of this patent is extended or adjusted under 35 U.S.C. 154(b) by 204 days.

(21) Appl. No.: 15/335,797

(22) Filed: Oct. 27, 2016

(65) Prior Publication Data

US 2017/0168179 A1    Jun. 15, 2017

(30) Foreign Application Priority Data

Dec. 11, 2015   (EP) ..................................... 15290308

(51) Int. Cl.
*G01V 1/28* (2006.01)
*G01V 1/30* (2006.01)
(Continued)

(52) U.S. Cl.
CPC .......... *G01V 1/306* (2013.01); *E21B 47/0005* (2013.01); *E21B 47/082* (2013.01);
(Continued)

(58) Field of Classification Search
CPC ....... E21B 47/0005; G01V 1/306; G01V 1/50
(Continued)

(56) References Cited

U.S. PATENT DOCUMENTS

| 4,928,269 A | 5/1990 | Kimball et al. |
| 5,146,432 A | 9/1992 | Kimball et al. |

(Continued)

FOREIGN PATENT DOCUMENTS

| WO | 2015023384 A1 | 2/2015 |
| WO | 2015023386 A1 | 2/2015 |

OTHER PUBLICATIONS

Smaine Zeroug, "Analytical Modeling for Fast Simulations of Ultrasonic Measurements on Fluid-Loaded Layered Elastic Structures," IEEE Transactions on Ultrasonics, vol. 47, No. 3, p. 565-571, May 2000.

(Continued)

*Primary Examiner* — Stephanie E Bloss
(74) *Attorney, Agent, or Firm* — Sara K. M. Hinkley

(57) ABSTRACT

Techniques involve obtaining acoustic data (including waves reflected from the casing, the annular fill material, the formation, and/or interfaces between any of the mud, the casing, and the annular fill material) from an acoustic logging tool. Techniques include normalizing the acoustic wave to result in a normalized wave having a comparable spectral shape with a reference wave, and comparing the normalized wave with the reference wave. The reference wave may be generated or modeled or produced from a look-up table or database, and may be estimated based on initial estimates of wellbore parameters. Based on the comparison of the normalized wave with the reference wave, a best-fit reference wave substantially matching the normalized wave may be identified. The best-fit reference wave may correspond with a thickness of the casing, an acoustic impedance of the annular fill material, and an acoustic impedance of mud.

17 Claims, 15 Drawing Sheets

(51) Int. Cl.
*G01V 1/32* (2006.01)
*G01V 1/50* (2006.01)
*E21B 47/00* (2012.01)
*E21B 47/08* (2012.01)

(52) U.S. Cl.
CPC ............... *G01V 1/282* (2013.01); *G01V 1/32* (2013.01); *G01V 1/50* (2013.01); *G01V 2210/6224* (2013.01); *G01V 2210/6226* (2013.01); *G01V 2210/677* (2013.01)

(58) Field of Classification Search
USPC .......................................................... 702/12
See application file for complete search history.

(56) References Cited

U.S. PATENT DOCUMENTS

| | | |
|---|---|---|
| 5,216,638 A | 6/1993 | Wright |
| 5,763,773 A | 6/1998 | Birchak et al. |
| 6,041,861 A | 3/2000 | Mandal et al. |
| 2005/0261835 A1* | 11/2005 | Wang ........................ G01V 1/48 702/6 |
| 2007/0019506 A1 | 1/2007 | Mandal et al. |
| 2010/0118649 A1* | 5/2010 | Zhao .................. E21B 47/0005 367/35 |
| 2010/0296367 A1* | 11/2010 | Delprat-Jannaud .... G01V 1/306 367/53 |
| 2012/0033528 A1* | 2/2012 | Zhao ..................... E21B 47/082 367/28 |
| 2012/0201096 A1 | 8/2012 | Valero et al. |
| 2013/0114376 A1 | 5/2013 | Aeron et al. |
| 2013/0114377 A1 | 5/2013 | Frisch |
| 2013/0155812 A1* | 6/2013 | Froelich .............. E21B 47/0005 367/35 |
| 2014/0169127 A1* | 6/2014 | Orban ..................... G01V 1/40 367/25 |
| 2014/0269165 A1* | 9/2014 | Froelich .............. E21B 47/0005 367/7 |
| 2015/0219780 A1 | 8/2015 | Zeroug et al. |
| 2016/0109604 A1 | 4/2016 | Zeroug et al. |
| 2016/0109605 A1 | 4/2016 | Bose et al. |

OTHER PUBLICATIONS

Extended European Search Report issued in the related EP Application 15290308.4, dated Jun. 22, 2016 (10 pages).

International Search Report and the Written Opinion issued in the related PCT application PCT/US2016/059633, dated Jan. 10, 2017 (11 pages).

\* cited by examiner

RESONANCE-BASED INVERSION OF ACOUSTIC IMPEDANCE OF ANNULUS BEHIND CASING

CROSS-REFERENCE TO RELATED APPLICATIONS

The present invention claims the benefits of European Patent Application No. 15290308.4, filed on Dec. 11, 2015, titled "Resonance-Based Inversion Of Acoustic Impedance Of Annulus Behind Casing," the entire content of which is hereby incorporated by reference into the current application.

BACKGROUND

The present invention relates to techniques for performing wellbore operations. More particularly, the present invention relates to techniques for determining characteristics of subterranean formations using acoustic wellbore data.

This section is intended to introduce the reader to various aspects of art that may be related to various aspects of the present disclosure, which are described and/or claimed below. This discussion is believed to be helpful in providing the reader with background information to facilitate a better understanding of the various aspects of the present disclosure. Accordingly, it should be understood that these statements are to be read in this light, and not as admissions.

In a well completion, a string of casing or pipe is typically set in a wellbore, and an annulus fill material (e.g., cement) is disposed in the annular space between the casing and the earth formation. One objective of filling the annular space is to separate oil- and gas-producing layers from each other, and from water-bearing formation strata. If the cement fails to provide isolation of one zone from another, fluids under pressure may migrate from one zone to another, reducing production efficiency. Also, migration of hydrocarbons into aquifers is environmentally and economically undesirable. Evaluating the annulus content is important for reliable determination of the zonal isolation of the different strata of a formation.

Acoustic evaluation is often used to determine whether the cement provides hydraulic zonal isolation between formation strata traversed by the drilled well. Certain acoustic measurements, such as the ultrasonic pulse-echo measurement, have been widely used in cement evaluation to provide the effective acoustic impedance of the annulus material adjacent to the casing with high azimuthal and axial resolution and thereby evaluate cement characteristics and zonal isolation. For example, an ultrasonic pulse-echo tool may transmit a broadband pulse, usually between 200 and 700 kHz, to the casing wall to excite a thickness resonance mode in the casing. The acquired signals may be processed using modeling techniques to estimate the annular acoustic impedance. However, some conventional approaches are more suitable for thinner casings (e.g., casings thinner than 12 mm), and have not been as suitable for the larger and thicker casings in acoustically-attenuative (heavier) borehole muds that are more commonly used today. Such wellbore environments can result in acoustic behavior that reduces the accuracy of cement evaluation.

SUMMARY

A summary of certain embodiments disclosed herein is set forth below. It should be understood that these aspects are presented merely to provide the reader with a brief summary of these certain embodiments and that these embodiments are not intended to limit the scope of the systems and methods described herein. Indeed, embodiments of systems and methods described herein may encompass a variety of aspects that may not be set forth below.

Embodiments described herein relate to systems, methods, and computer-readable media for the evaluation of wellbore annulus properties based on inversion of acoustic measurements. According to some embodiments, a method is provided for determining properties of a wellbore in a formation. The wellbore includes a casing and an annular fill material between the casing and the formation and mud between the casing and an acoustic logging tool. The method involves obtaining acoustic data from the acoustic logging tool, wherein the acoustic data includes an acoustic wave reflected from the casing, the annular fill material, one or more interfaces between any of the mud, the casing, and the annular fill material, or combinations thereof. The method further includes normalizing the acoustic wave to result in a normalized wave having a comparable spectral shape with a reference wave, comparing the normalized wave with the reference wave, and based on the comparison of the normalized wave with the reference wave, identifying a best-fit reference wave substantially matching the normalized wave. Furthermore, the method includes determining a thickness of the casing, an acoustic impedance of the annular fill material, and an acoustic impedance of mud, based on the best-fit reference wave.

Moreover, in some embodiments, a non-transitory computer-readable medium storing computer-executable instructions is provided. When executed by at least one processor, the instructions cause the at least one processor to perform the following: inputting, from an acoustic tool deployed in a wellbore comprising mud, casing, and annular fill, an acoustic waveform comprising one or more reflected acoustic waves; normalizing the acoustic waveform, resulting in a normalized waveform having a comparable spectral shape with a reference waveform; producing the reference waveform based on an initially estimated thickness of the casing, modeling of wellbore parameters, or combinations thereof; comparing the normalized waveform with the reference waveform; iteratively producing a new reference waveform, if the normalized waveform does not match the reference waveform; iteratively comparing the normalized waveform with the new reference waveform, until the normalized waveform substantially matches a matching reference waveform; and estimating a casing thickness, an acoustic impedance of the annular fill, and an acoustic impedance of mud between the casing and the acoustic tool based on the matching reference waveform.

BRIEF DESCRIPTION OF THE DRAWINGS

The detailed description is set forth with reference to the accompanying drawings. The use of the same reference numerals may indicate similar or identical items. Various embodiments may utilize elements and/or components other than those illustrated in the drawings, and some elements and/or components may not be present in various embodiments. Elements and/or components in the figures are not necessarily drawn to scale. Additionally, depending on the context, singular and plural terminology may be used interchangeably.

DETAILED DESCRIPTION

Figure 1:
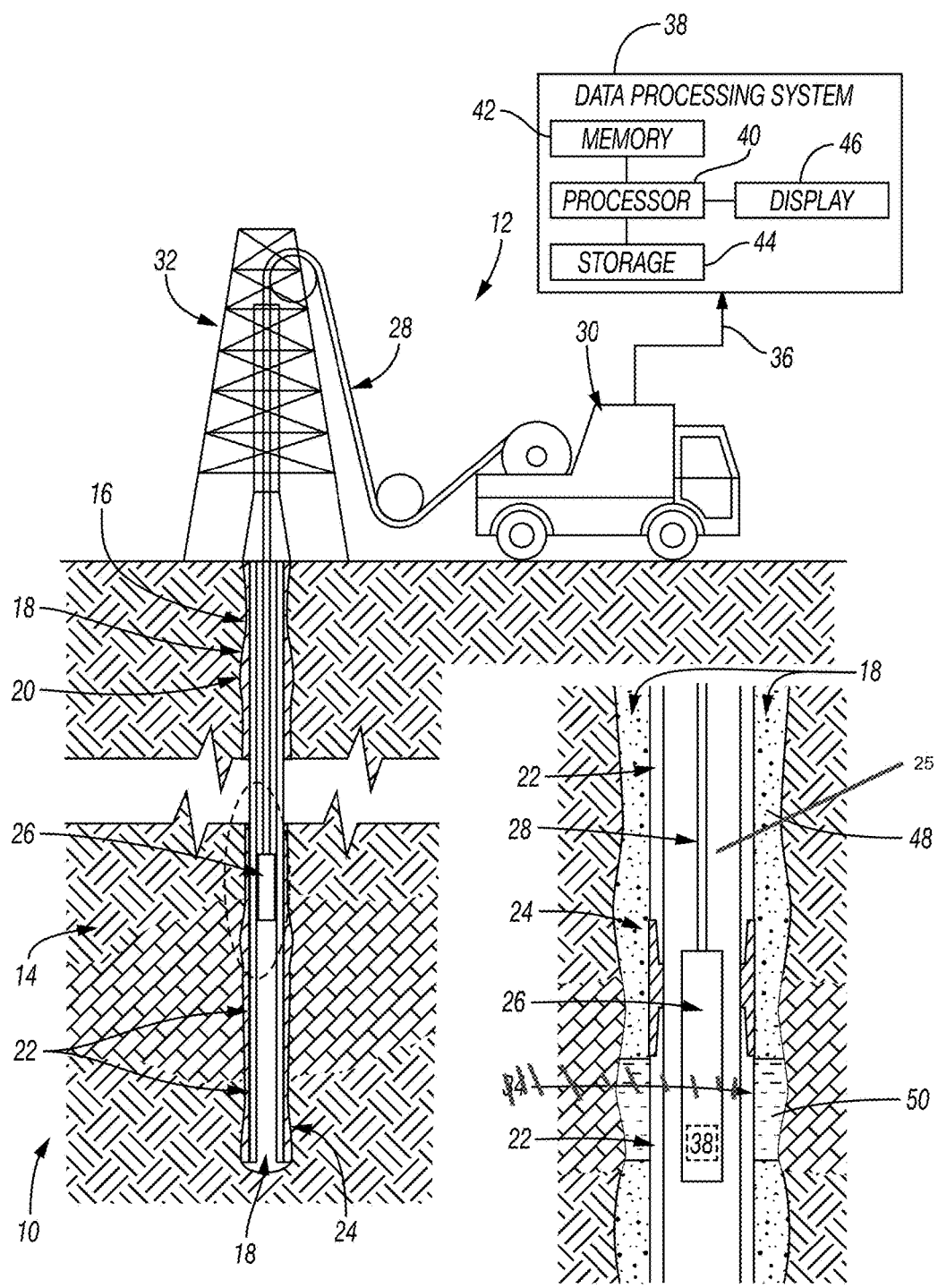
FIG. 1 is a schematic diagram of an example system for evaluating cement installation and zonal isolation of a well in accordance with one or more example embodiments.

One or more specific embodiments of the present disclosure will be described below. These described embodiments are just examples of the presently disclosed techniques. Additionally, in an effort to provide a concise description of these embodiments, features of an actual implementation may not be described in the specification. It should be appreciated that in the development of any such actual implementation, as in any engineering or design project, numerous implementation-specific decisions may be made to achieve the developers' specific goals, such as compliance with system-related and business-related constraints, which may vary from one implementation to another. Moreover, it should be appreciated that such a development effort might be complex and time consuming, but would still be a routine undertaking of design, fabrication, and manufacture for those of ordinary skill having the benefit of this disclosure.

When introducing elements of various embodiments of the present disclosure, the articles "a," "an," and "the" are intended to mean that there are one or more of the elements. The terms "comprising," "including," and "having" are intended to be inclusive and mean that there may be additional elements other than the listed elements. Additionally, it should be understood that references to "one embodiment" or "an embodiment" of the present disclosure are not intended to be interpreted as excluding the existence of additional embodiments that also incorporate the recited features.

When a well is drilled, metal casing may be installed inside the well and annular fill material (e.g., cement, resin, etc.) may be placed into the annulus between the casing and the wellbore. When the annular fill material sets, fluids from one zone of the geological formation may not be able to pass through the annulus of the wellbore to interact with another zone. This condition is referred to as "zonal isolation." Proper cement installation may also ensure that the well produces from targeted zones of interest. To verify that the cement has been properly installed, this disclosure teaches systems and methods for evaluating acoustic cement evaluation data. As used herein, "acoustic data" refers to any combination of one or more acoustic waveforms, acoustic attenuation data, acoustic amplitude data, acoustic impedance data, flexural attenuation data, and/or other types of acoustic data useful for well integrity analysis that may be obtained from one or more acoustic downhole tools, including tools using sonic measurements, ultrasonic measurements, or both.

The acoustic data that is obtained by the acoustic downhole tools may be parameterized based on initial assumptions on the characteristics of the well and/or the acoustic downhole tools and further processed to determine conditions of the well. For instance, the acoustic data may include an assumed characteristic of the annulus of the well. However, conventional processing techniques may not always use thorough and accurate assumptions on all well characteristics. Yet parameterization errors or inaccuracies could incorrectly predict the actual conditions in the well. As a result, the acoustic cement evaluation data may not accurately reflect the true conditions of the well. In addition, log data may have other ambiguities or uncertainties which may also reduce accuracy in processing and predicting conditions of the well.

This disclosure teaches various ways to improve the investigation of annulus material in a well using an inversion workflow utilizing information in the resonance tail in of an acoustic waveform. One or more embodiments involve a workflow normalizing the acoustic waveform to result in a normalized waveform having a clear resonance notch in its spectrum, and matching reference waveforms with the normalized acoustic waveform. This iterative inversion process may be performed until a matching reference waveform is identified. This matching waveform may be processed to more accurately estimate wellbore parameters, such as acoustic impedance of the annular fill material, acoustic impedance of the mud, and/or thickness of the casing.

FIG. 1 schematically illustrates an example system 10 for evaluating cement behind casing in a well. In particular, FIG. 1 illustrates surface equipment 12 above a geological formation 14. In the example of FIG. 1, a drilling operation has previously been carried out to drill a wellbore 16. In addition, an annular fill 18 has been used to seal an annulus 20—the space between the wellbore 16 and casing joints 22 and collars 24—with cementing operations. In some embodiments, the annular fill 18 may include cement, resin, or any other material suitable for filling the annulus 20.

As seen in FIG. 1, several casing joints 22 (also referred to below as casing 22) represent lengths of pipe that are coupled together by the casing collars 24 to form a casing string which stabilizes the wellbore 16. The casing joints 22 and/or collars 24 may be made of carbon steel, stainless steel, or other suitable materials to withstand a variety of forces, such as collapse, burst, and tensile failure, as well as chemically aggressive fluid.

The surface equipment 12 may carry out various well logging operations to detect conditions of the wellbore 16. The well logging operations may measure parameters of the geological formation 14 (e.g., resistivity or porosity) and/or the wellbore 16 (e.g., temperature, pressure, fluid type, or fluid flowrate). Other measurements may provide acoustic cement evaluation and well integrity data (e.g., casing thickness, apparent acoustic impedance, drilling fluid impedance, etc.) that may be used to verify the cement installation and the zonal isolation of the wellbore 16. One or more acoustic logging tools 26 may obtain some of these measurements.

The example of FIG. 1 shows the acoustic logging tool 26 being conveyed through the wellbore 16 by a cable 28. Such a cable 28 may be a mechanical cable, an electrical cable, or an electro-optical cable that includes a fiber line protected against the harsh environment of the wellbore 16. In other examples, however, the acoustic logging tool 26 may be conveyed using any other suitable conveyance, such as coiled tubing. In some embodiments, drilling fluid or mud 25 may be present around the acoustic logging tool 26 as it is conveyed in the wellbore 16.

The acoustic logging tool 26 may be deployed inside the wellbore 16 by the surface equipment 12, which may include a vehicle 30 and a deploying system such as a drilling rig 32. Data related to the geological formation 14 or the wellbore 16 gathered by the acoustic logging tool 26 may be transmitted to the surface, and/or stored in the acoustic logging tool 26 for later processing and analysis. As will be discussed further below, the vehicle 30 may be fitted with or may communicate with a computer and software to perform data collection and analysis.

FIG. 1 also schematically illustrates a magnified view of a portion of the cased wellbore 16. As mentioned above, the acoustic logging tool 26 may obtain acoustic data 36 (e.g., acoustic waveforms) used to evaluate the integrity of the cased wellbore 16. When the acoustic logging tool 26 provides such measurements to the surface equipment 12 (e.g., through the cable 28), the surface equipment 12 may pass the measurements as acoustic data 36 to a data processing system 38 (e.g., a cement evaluation system) that includes a processor 40, memory 42, storage 44, and/or a display 46. In other examples, the acoustic data 36 may be processed by a similar data processing system 38 at any other suitable location. For example, in some embodiments, all or a portion of data processing may be performed by a data processing system 38 in the acoustic logging tool 26 or near the acoustic logging tool 26 downhole.

The data processing system 38 may collect the acoustic data 36 which may be evaluated to estimate properties associated with the integrity of the wellbore 16, such as a thickness of the casing 22, an apparent acoustic impedance of the annular fill 18, and/or an apparent acoustic impedance of the drilling fluid 25. To do this, the processor 40 may execute instructions stored in the memory 42 and/or storage 44. As such, the memory 42 and/or the storage 44 of the data processing system 38 may be any suitable article of manufacture that can store the instructions. The memory 42 and/or the storage 44 may be ROM memory, random-access memory (RAM), flash memory, an optical storage medium, or a hard disk drive, etc. The display 46 may be any suitable electronic display that can display the logs and/or other information relating to classifying the material in the annulus 20 behind the casing 22. The processor 40 is not limited to any particular device type or system. The processor 40 may be a computer, such as a laptop computer, a desktop computer, or a mainframe computer, though the processor 40 is not limited to a computer. For example, in some embodiments, the processor 40 may also include one or more application specific processors (e.g., ASICs), one or more field programmable logic arrays (FPGAs), or any combinations thereof. The processing system may include a graphical user interface (GUI) so that a user can interact with the processor 40. The processor 40 may also include a processor (e.g., a microprocessor, microcontroller, digital signal processor, or general purpose computer) for executing any of the methods and processes described herein.

In some embodiments, the acoustic data 36 from the acoustic logging tool 26 may be used to determine the presence of solid cement in the annular fill 18 has been installed as expected. In some cases, the acoustic data 36 may be evaluated to determine whether the cement of the annular fill 18 has a generally solid character (e.g., as indicated at numeral 48) and therefore has properly set. In other cases, the acoustic data 36 may indicate the potential absence of cement or that the annular fill 18 has a generally liquid or gas character (e.g., as indicated at numeral 50), which may imply that the cement of the annular fill 18 has not properly set. Moreover, in some embodiments, the acoustic data 36 may be used to indicate various parameters relating to the wellbore 16, such as parameters of the annular fill 18, the casing 22, and fluid (i.e., drilling fluid, mud) between the casing 22 and the tool 26. For example, the data processing system 38 may be used to estimate or output an estimated thickness of the casing 22, an acoustic impedance of the annular fill 18, and/or an acoustic impedance of the fluid.

The acoustic logging tool 26 may be, for example, an UltraSonic Imager (USI™) tool and/or an Isolation Scanner™ tool by Schlumberger. The acoustic logging tool 26 may obtain acoustic data 36 to evaluate properties of the cased wellbore 16 in accordance with embodiments of the present techniques. For instance, the acoustic logging tool 26 may obtain a pulse echo measurement that exploits the thickness mode (e.g., in the manner of an ultrasonic imaging tool) or may perform a pitch-catch measurement that exploits the casing flexural mode. The ultrasonic pitch-catch technique may be based on exciting and detecting from the casing quasi-Lamb modes with emphasis on the lowest-order anti-symmetric mode (AO) often referred as the flexural mode. The casing flexural mode also radiates elastic energy into the annulus between casing and formation (or between a primary casing and a secondary one as it occurs for multiple string situations). When the annulus is filled with cement, either a shear wave only or both shear and compressional waves may be radiated into the cement layer, depending on the mechanical properties of the cement or annulus material.

Figure 2:
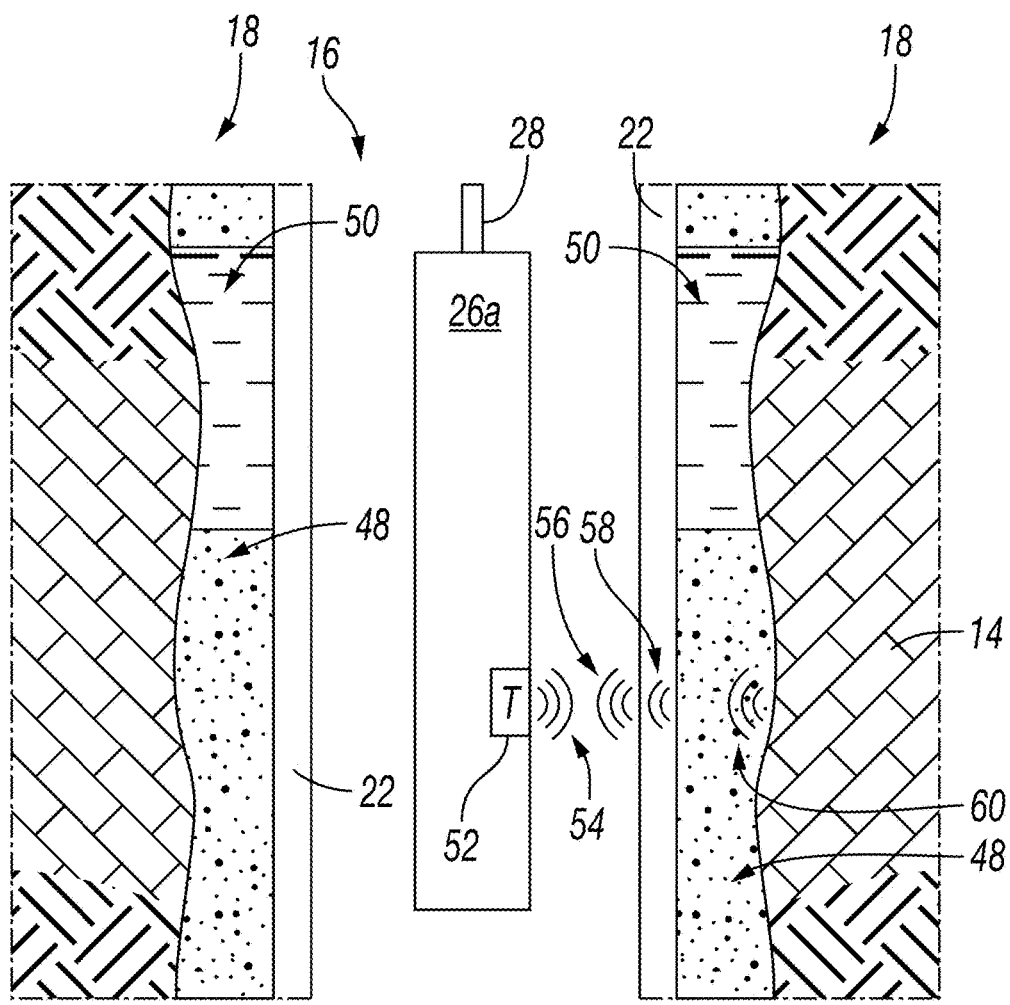
FIG. 2 is a schematic representation of an example acoustic downhole tool to obtain pulse-echo acoustic cement evaluation data in accordance with one or more example embodiments.

With this in mind, FIG. 2 provides a general example of the operation of the acoustic logging tool 26a in the wellbore 16. Specifically, a transducer 52 in the acoustic logging tool 26 may emit acoustic waves 54 out toward the casing 22. Reflected waves 56, 58, and 60 may correspond to interfaces at the casing 22, the annular fill 18, and the geological formation 14 or an outer casing, respectively. The reflected waves 56, 58, and 60 may vary depending on whether the annular fill 18 is of the generally solid character 48 or the generally liquid or gas character 50. The reflected waves 56, 58, and 60 may be received at the same transducer 52 to be processed for cement evaluation. The acoustic logging tool 26 may use any suitable number of different techniques, including measurements of acoustic impedance from sonic waves, ultrasonic waves and/or flexural attenuation. When one or more of these measurements of acoustic cement evaluation data are obtained, they may be integrated and/or processed to determine characteristics of the annular fill 18.

Figure 3:
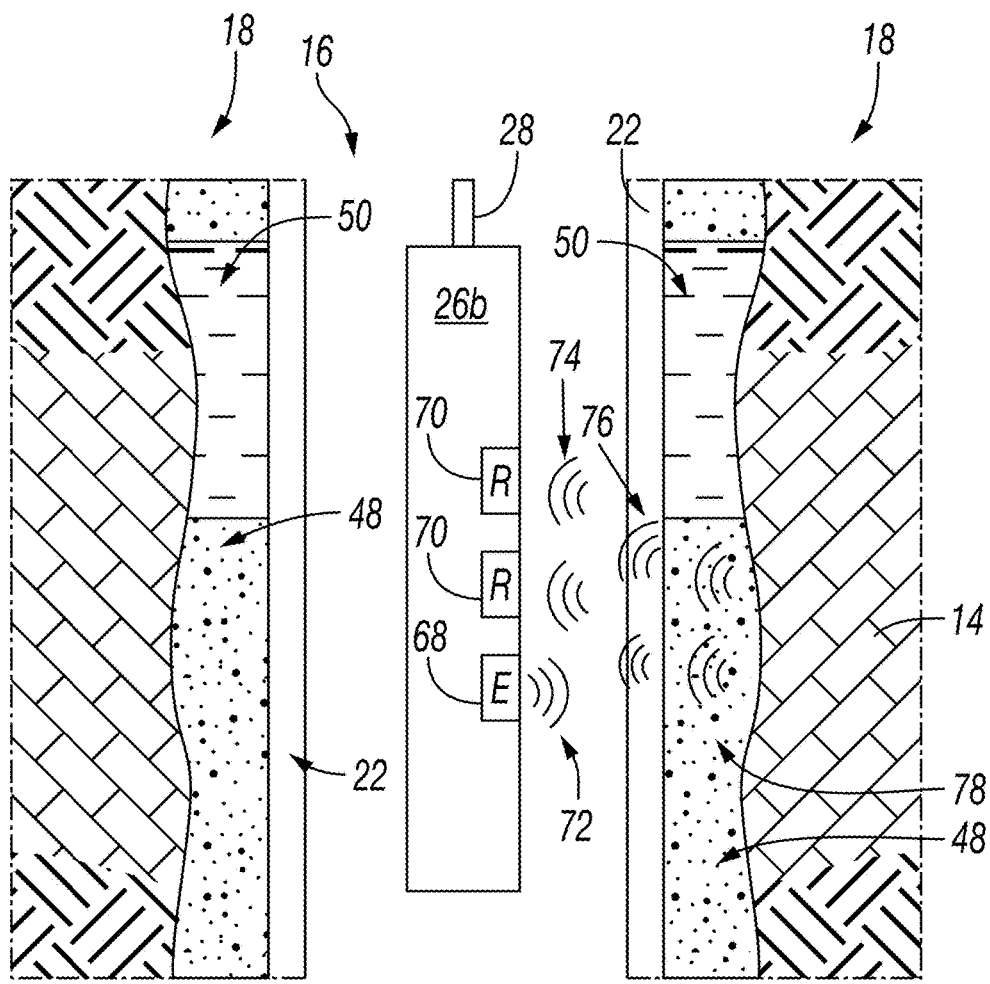
FIG. 3 is a schematic representation of an example acoustic downhole tool to obtain pitch-catch acoustic cement evaluation data in accordance with one or more example embodiments.

FIG. 3 provides another example embodiment of the acoustic logging tool 26b having an emitter 68 and a pair of receiver transducers 70. The emitter 68 in the acoustic logging tool 26a may emit acoustic energy 72 out toward the casing 22 resulting in reflected waves 74, 76, and 78. In the embodiments shown in FIG. 2, the emitted energy excites a predominantly zeroth-order asymmetric mode (also referred to as flexural mode). As in the embodiment described above, the acoustic waves 72 propagate via transmission into both sides of the casing wall 22. The transmission in the casing annulus depends on the material on the outer side of the casing wall with a different amount of energy leak inside the annulus. The acoustic logging tool embodiment depicted in FIG. 3 may use measurements of acoustic impedance from flexural attenuation. The different distance from the emitter 68 and the two receiver transducers 70 and the energy leak induce different amplitudes on the measured acoustic pressure.

One or more aspects or embodiments of the present techniques may be applicable to thickness mode, pulse-echo measurements such as those obtained by the tool 26a in FIG. 2 and flexural mode, pitch-catch measurements such as those obtained by the tool 26b in FIG. 3. Accordingly, the acoustic data 36 used in the resonance-based inversions of the present techniques may be from tool 26a, tool 26b, or from any other suitable acoustic logging tool, generalized as tool 26. Furthermore, acoustic data 36 may include acoustic waveforms or reflected waves from the casing 22, the annular fill 18, the formation 14, and/or any of the interfaces between mud and the casing 22, annular fill 18, formation 14. The acoustic data 36 may also be referred to as the acoustic waveforms or measured waveforms.

Figure 4:
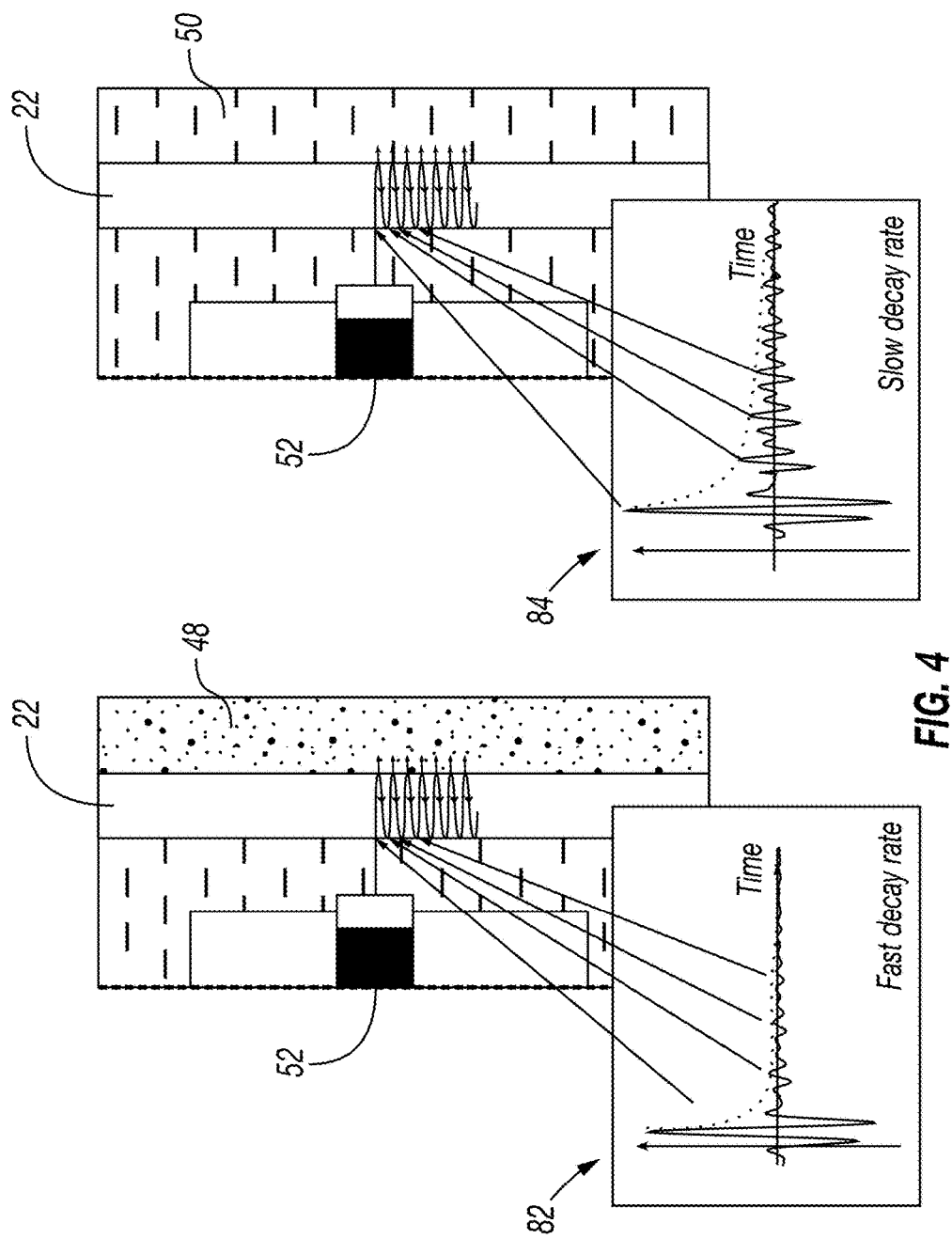
FIG. 4 is a cross-sectional representation of an acoustic logging tool in a cased wellbore in filled- and free-pipe conditions and corresponding representations of decays of an acoustic response in accordance with one or more example embodiments.

Various acoustic processing techniques have been used to estimate the acoustic impedance of the annulus based on a model where the thickness resonance is dependent on reflection coefficients at the inner and outer walls of the casing. The reflection coefficients may be defined in terms of the acoustic impedance of the media at each of these interfaces (e.g., interface between the drilling fluid and casing material, interface between casing and the annular material, etc.). As further represented in FIG. 4, different conditions behind the casing 22 may result significantly different decay behaviors of the received waveform's resonance tail. The resonance tail when the annular fill 18 behind the casing 22 is solid (e.g., as generally indicated by numeral 48) may have a relatively fast decay rate 82, while the resonance tail when there is gas or liquid (e.g., as indicated by numeral 50, and also referred to as free pipe condition) behind the casing 22 may have a relatively slow decay rate 84.

In some conventional acoustic processing techniques, annular parameters such as the annular acoustic impedance may be obtained by matching an observed acoustic waveform to a synthetic acoustic waveform predicted by one-dimensional modelling using estimated parameters. From this, the impedance of the casing and mud may be assumed. This type of model may suitably approximate cases where the energy remains mostly compressional and propagates normally to the casing wall which is assumed to be planar at the region where the transducer beam insonifies the casing wall, and where shear mode conversion is insignificant.

However, in certain cases, such as when casings are relatively thicker (e.g., thicker than ~12 mm), when heavier drilling fluids are used, when the wellbore is deviated, or when the tool becomes eccentered, three-dimensional propagation effects and shear mode conversion are no longer insignificant and may impact the accuracy and robustness of the results from conventional acoustic inversion processing techniques. Moreover, the conventional processing technique of using known or assumed mud impedance may also contribute to inaccuracies, as many weighted muds and specially formulated muds may not have known mud impedances. The use of such assumptions in conventional processing techniques may thereby impact the accuracy of estimating the acoustic impedance of the annulus.

In one or more embodiments of the present techniques, a resonance-based inversion technique may involve an inversion workflow using a resonance notch of an acoustic waveform to determine parameters and characteristics of a borehole, such as an acoustic impedance of the annular fill 18, an acoustic impedance of the mud between the tool 26 and the casing 22, and/or a thickness of the casing 22.

Figure 5:
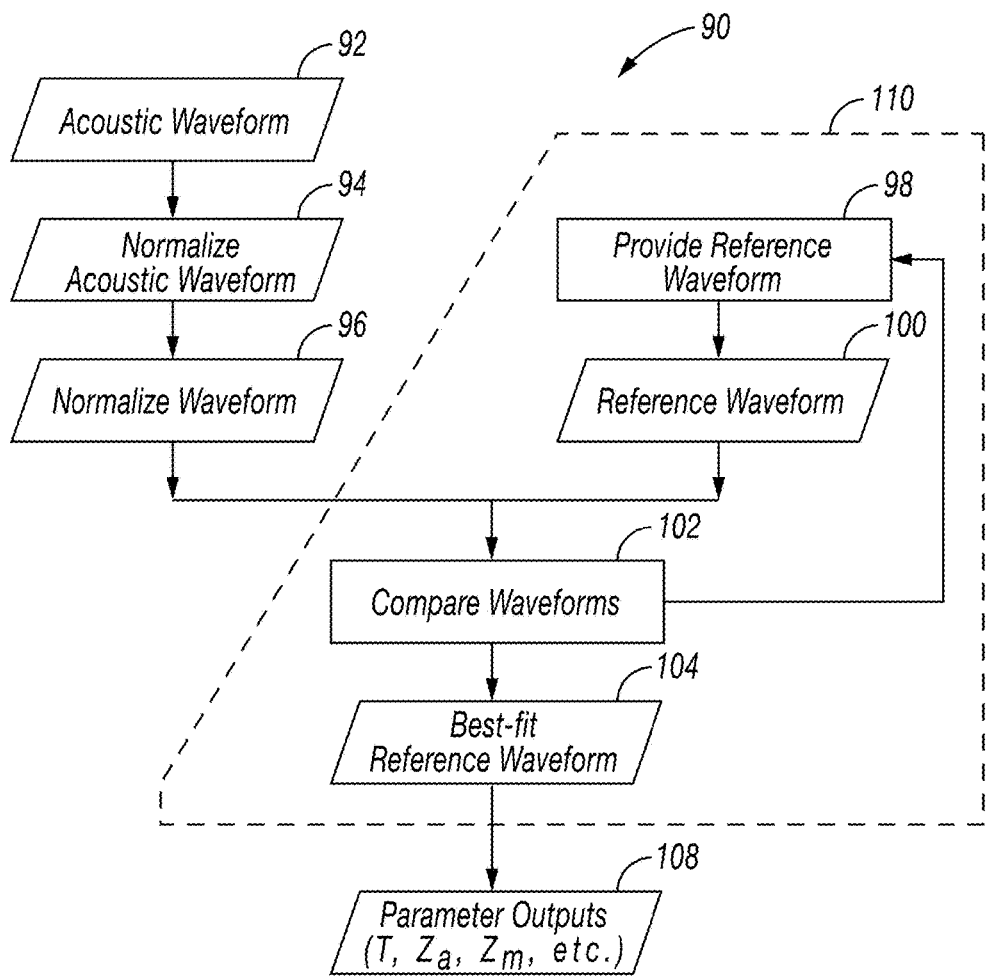
FIG. 5 is a workflow of a resonance-based inversion process in accordance with one or more example embodiments.

FIG. 5 is a resonance-based inversion workflow 90 representing one or more embodiments of the present techniques. In the workflow 90, an acoustic waveform 92 (e.g., acoustic data 36) may be normalized (block 94) to regularize the input waveform spectrum so that it does not depend on and is not substantially affected by the input spectrum or the attenuation properties of the borehole fluid. In some embodiments, the acoustic waveform 92 may be normalized with respect to a reference waveform. The acoustic waveform 92 and a reference waveform may be normalized to a comparable spectral shape. The normalized waveform 96 may be substantially free from conditions of the borehole which may have affected the frequency spectrum of the acoustic waveform 92.

In some embodiments, the workflow 90 involves an inversion process 110 which includes providing (block 98) a reference waveform 100. For example, the providing (block 98) the reference waveform 100 may involve using a waveform from a look-up table, and the waveform may be initially selected based on some input parameters of the wellbore. In some embodiments, the reference waveform 100 may be generated (e.g., algorithmically, by the data processing system 38 or by a synthetic wave generator associated with the data processing system 38) based on input parameters, or the reference waveform 100 may be selected from a look-up table which may be stored in, for example, memory 42 and/or the storage 44, and/or the reference waveform 100 may be in a database of experimental waveforms which may be stored in the memory 42 and/or storage 44. In some embodiments, new reference waveforms 100 may be generated throughout an iterative inversion process. Furthermore, the reference waveform 100 may have a comparable spectral shape compared to the acoustic waveform 96. The normalized waveform 96 and the reference waveform 100 may have a comparable spectral shape when they have a similar general spectral shape including similar general features (e.g., having a similar first echo). In other words, the general shape of the normalized waveform 96 and the reference waveform 100 may be substantially similar such that comparing or matching the two waveforms results in meaningful matches. In some embodiments, the reference waveform 100 may be pre-normalized to have a comparable spectral shape with the normalized waveform 96, or the reference waveform 100 and the acoustic waveform 92 may both be normalized to a spectrum such that they have a comparable spectral shape.

The workflow 90 may involve comparing (block 102) the normalized waveform 96 and the reference waveform 100 to find a best-fit reference waveform 104. As discussed, the reference waveform 100 may have a comparable spectral shape compared to the normalized waveform 96, such that the best-fit reference waveform 104 closely matches the normalized waveform 96. In some embodiments, the best-fit reference waveform 104 may be the reference waveform 100 that most closely matches the normalized waveform 96, and the inversion process 110 may iteratively provide (block 98) new reference waveforms 100 until a reference waveform 100 sufficiently matches the normalized waveform 96. The parameters which correspond to the best-fit reference waveform 104 may then be output from the workflow 90. The workflow for determining the best-fit reference waveform 104 may result in determining properties or characteristics of the wellbore that are more accurate than wellbore estimates generated from other processing techniques. In some embodiments, parameter outputs 108 of the workflow 90 may include an acoustic impedance of the annular fill 18, an acoustic impedance of the mud between the tool 26 and the casing 22, and/or a thickness of the casing 22.

Figure 6:
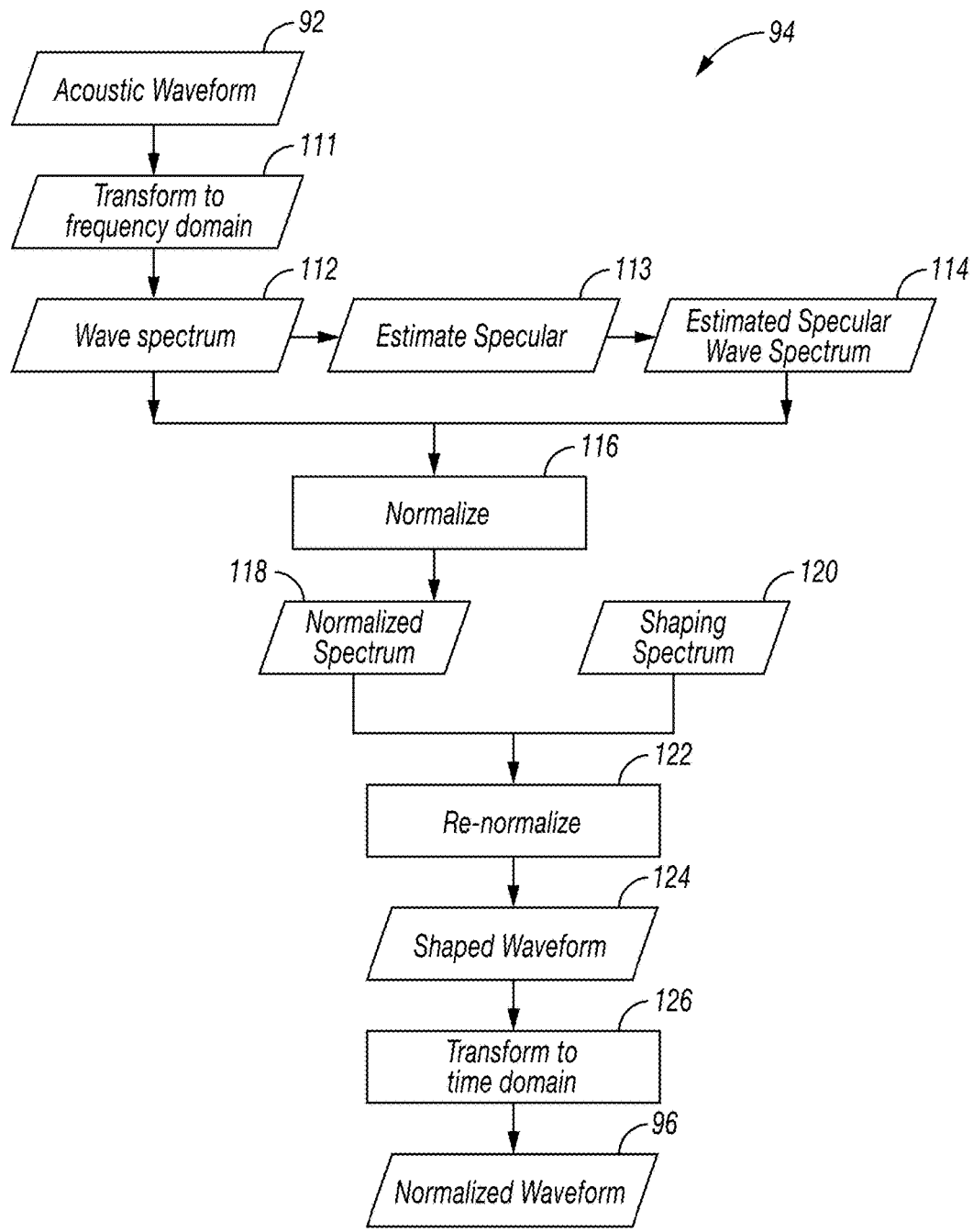
FIG. 6 is a workflow of a normalization workflow in the resonance-based inversion workflow of FIG. 5, in accordance with one or more example embodiments.
Figure 7:
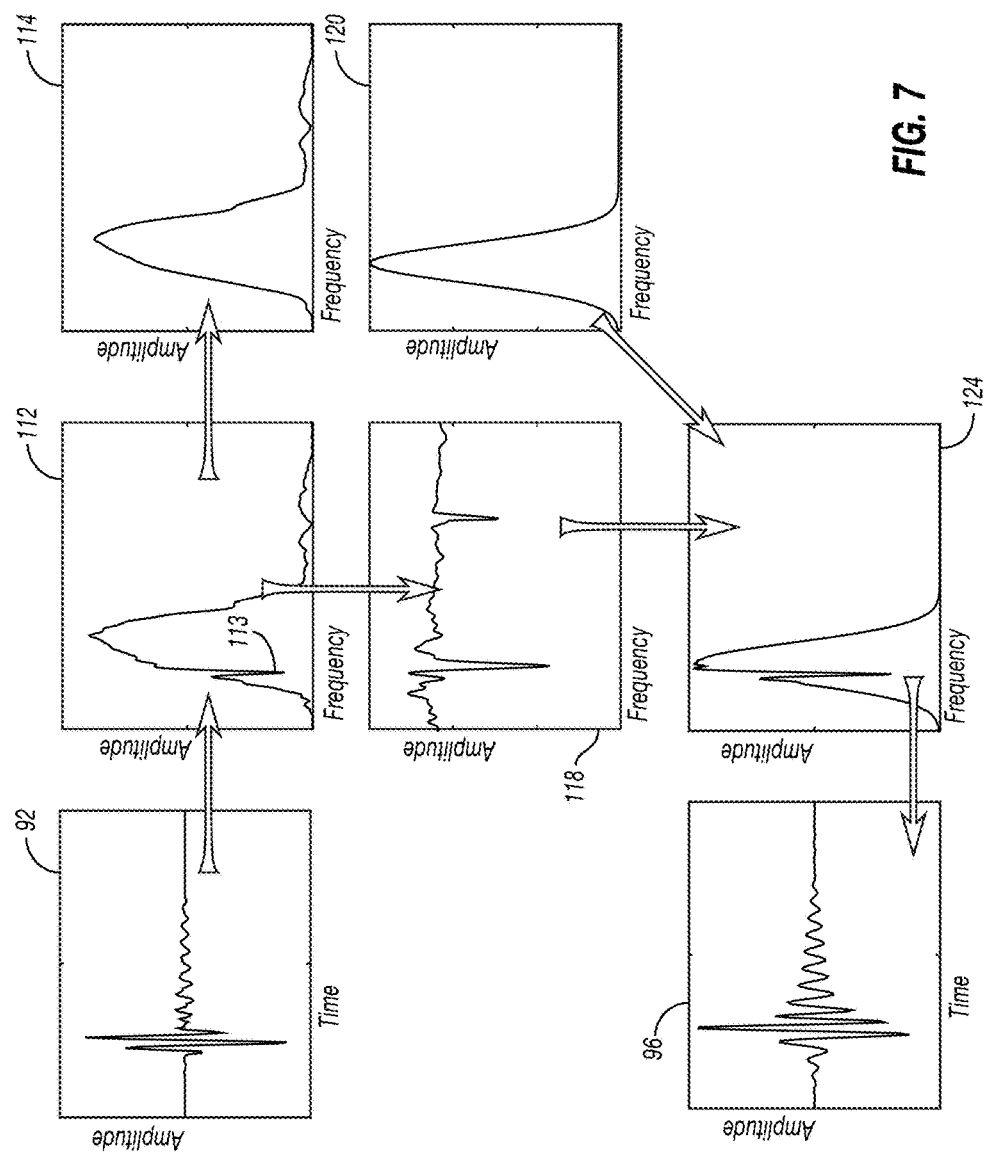
FIG. 7 is a graphical representation of the normalization workflow of FIG. 6, in accordance with one or more example embodiments.

A more detailed workflow 94 and graphical representations for normalizing the acoustic waveform 92 are provided in FIGS. 6 and 7. The workflow 94 of FIG. 6 refer to waveforms which are graphically depicted in FIG. 7. Accordingly, FIGS. 6 and 7 will be discussed concurrently. The normalizing workflow 94 may involve transforming (block 111; e.g., using a Fourier transform) the acoustic waveform 92 from the time domain to the frequency domain, resulting in a wave spectrum 112. The wave spectrum 112 may be used to estimate (block 113) an estimated specular wave spectrum 114, which may be a waveform produced from a priori knowledge and may be a waveform having a shape similar to the spectral waveform 112, but without the notch 113. In some embodiments, the estimated waveform 114 is an approximation of the first echo of transmitted acoustic wave 54 from the first interface of the casing 22. Alternatively, in some embodiments, the estimated waveform 114 may be generated based on the wave spectrum 112 and/or other a priori knowledge of wellbore conditions.

The normalization workflow 94 may involve normalizing (block 116) the wave spectrum 112 with the estimated specular wave spectrum 114 to determine the normalized spectrum 118. This normalized spectrum 118 may be an approximation of the spectrum of the system response of an infinitely short pulse. In some embodiments, the normalized spectrum 118 may be further processed to remove other echoes from other interfaces in the wellbore or other interferences or noise in the wellbore.

A shaping spectrum 120 (e.g., a Gaussian curve as depicted, though other suitable waveforms may be used) may be may be used to re-normalize (block 122) with the normalized spectrum 118 to result in the shaped waveform 124. The shaped waveform 124 may then be transformed (block 126) from the frequency domain to the time domain, resulting in the normalized waveform 96.

While the normalization workflow 94 is depicted as normalizing the acoustic waveform 92, in accordance with embodiments of the present techniques, a similar normalization workflow 94 may also be performed on the reference waveform 100. In some embodiments, the reference waveform 100 may be normalized to have a comparable spectral shape compared to the normalized waveform 96. Further, in some embodiments, the reference waveform 100 may be pre-normalized to have a comparable spectral shape as the normalized waveform 96, such that further normalization may not be needed. For example, a reference waveform generator or a modelling procedure may produce a reference waveform 100 that already has a substantially similar spectral shape as the normalized waveform 96.

Figure 8:
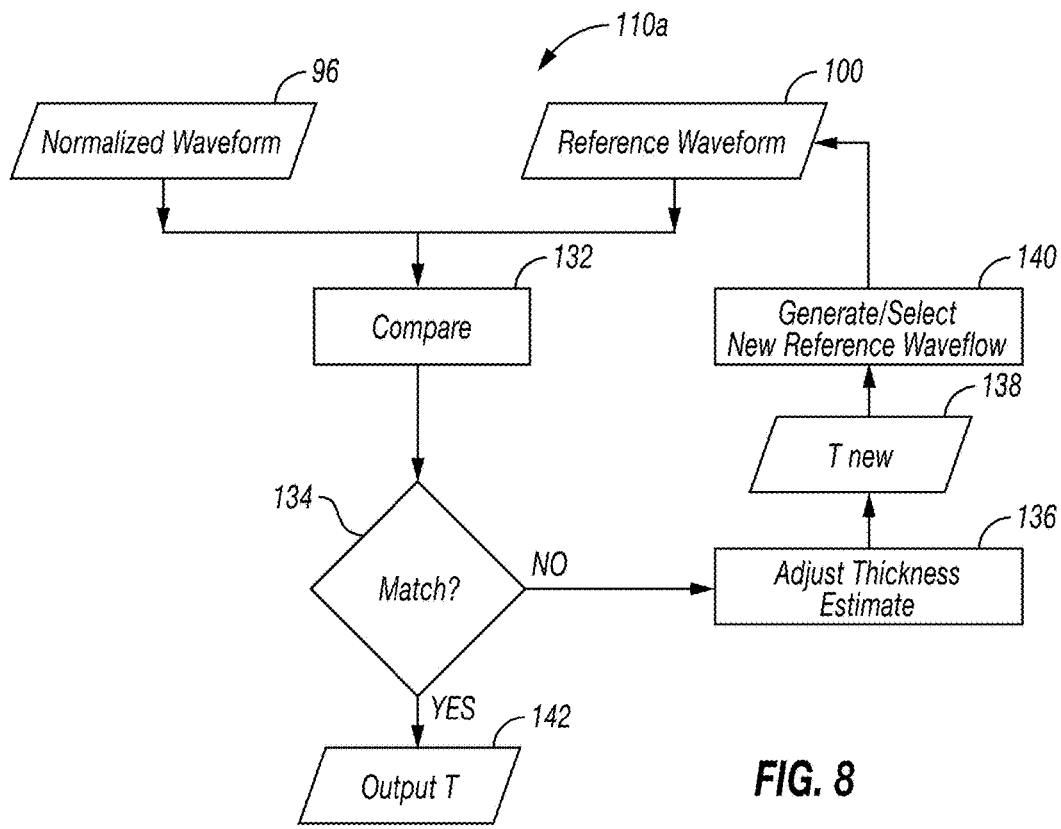
FIG. 8 is a workflow of an inversion process for estimating thickness in the resonance-based inversion workflow of FIG. 5, in accordance with one or more example embodiments.
Figure 9:
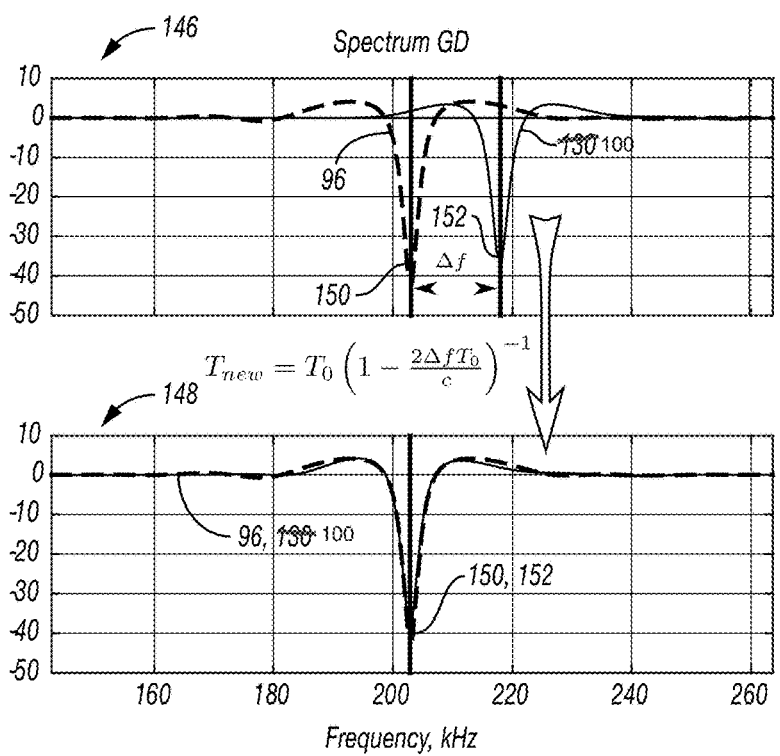
FIG. 9 is a graphical representation of the inversion workflow of FIG. 8, in accordance with one or more example embodiments.
Figure 10:
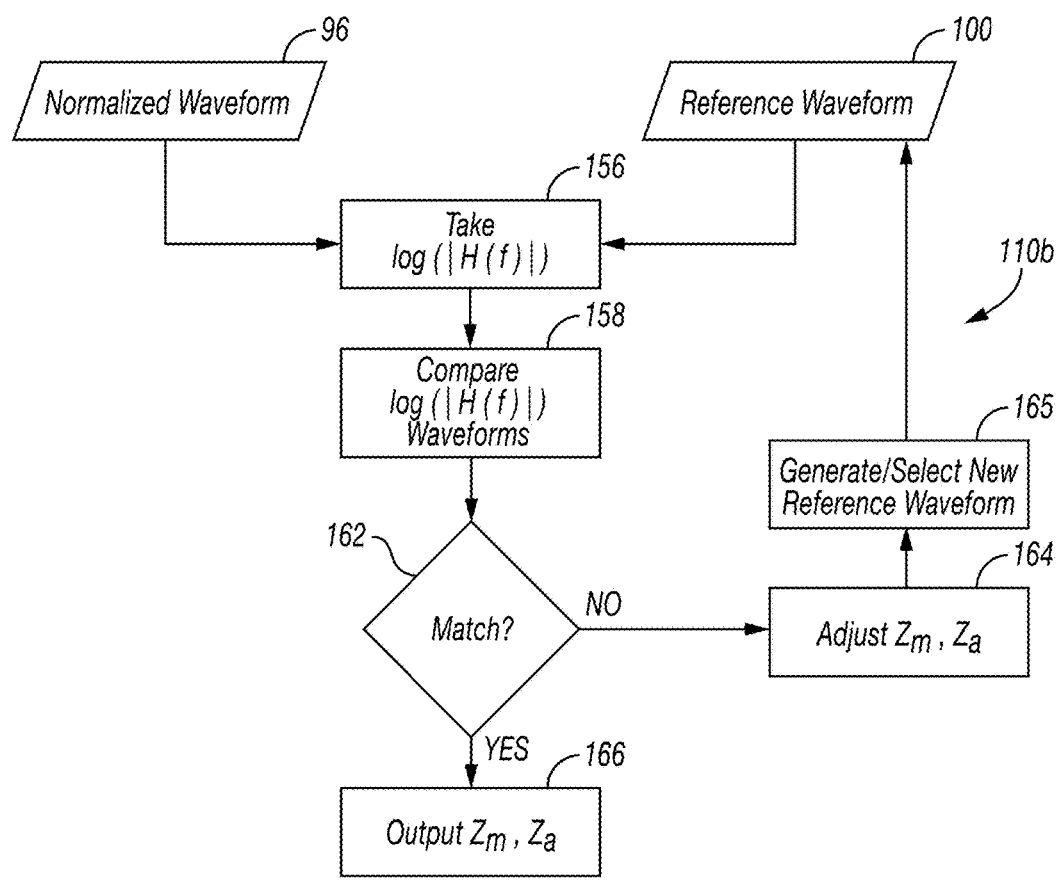
FIG. 10 is a workflow of an inversion process for estimating acoustic impedance in the resonance-based inversion workflow of FIG. 5, in accordance with one or more example embodiments.
Figure 11:
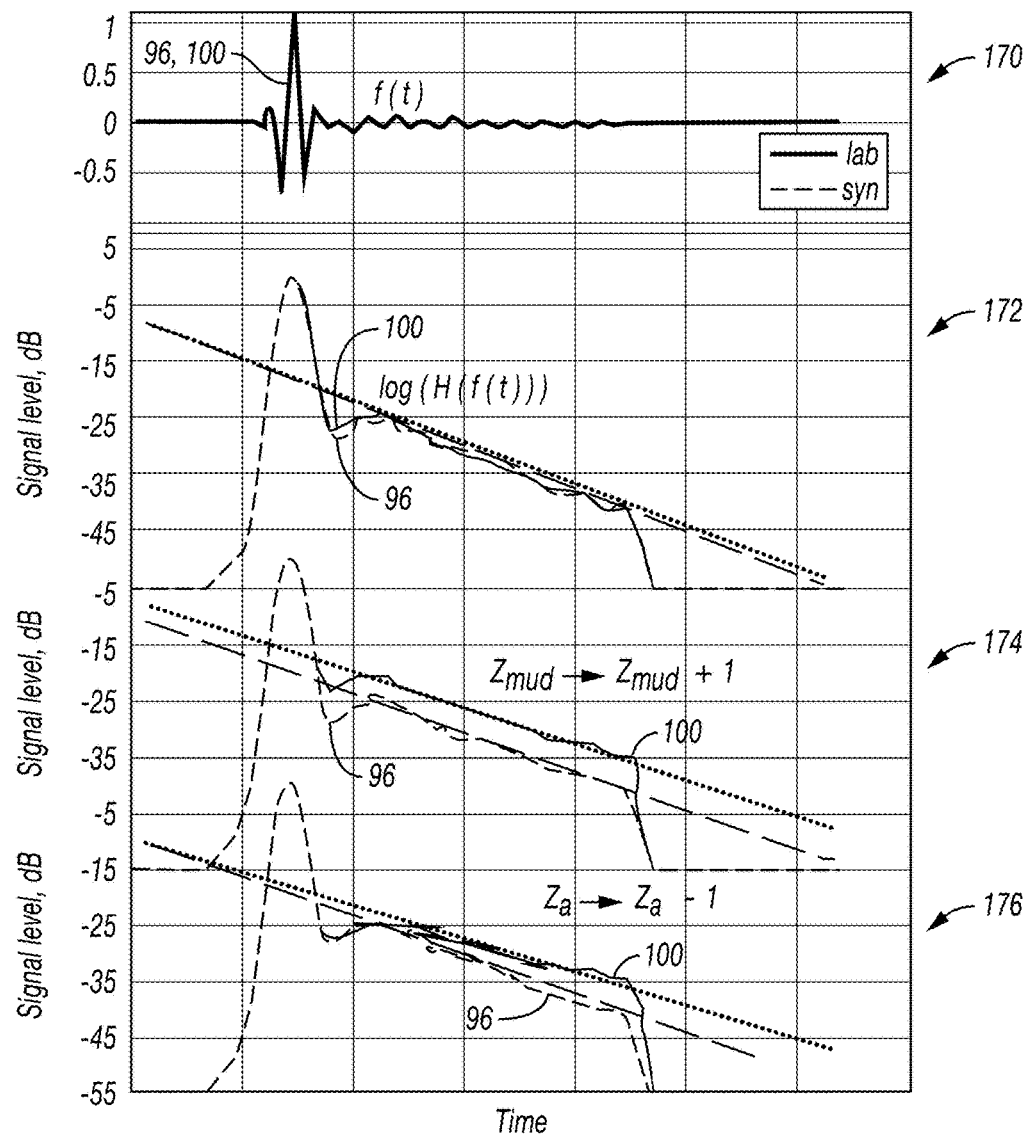
FIG. 11 is a graphical representation of the principle used in the inversion workflow of FIG. 10, in accordance with one or more example embodiments.
Figure 12:
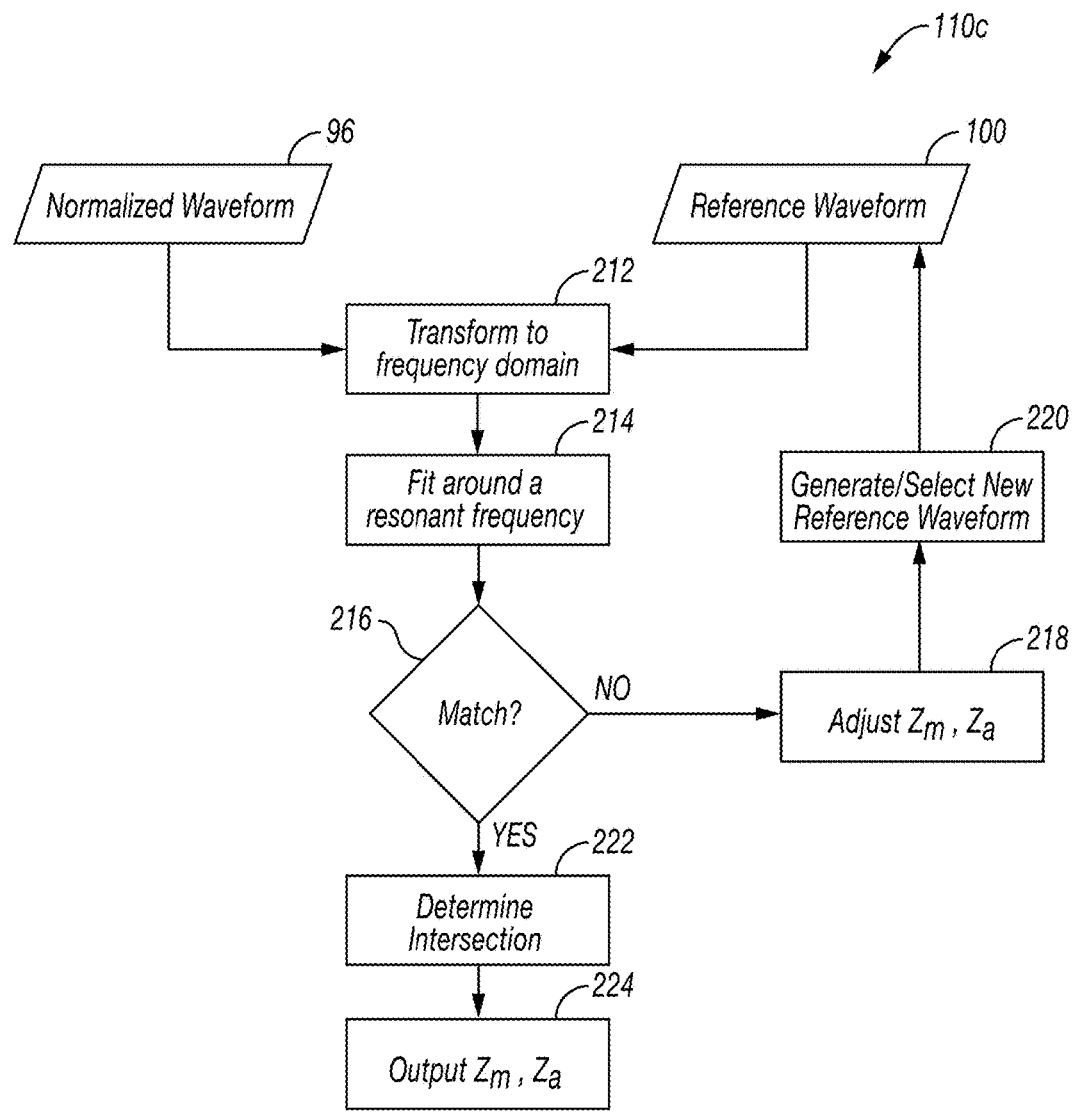
FIG. 12 is a workflow of another inversion process for estimating acoustic impedance in the resonance-based inversion workflow of FIG. 5, in accordance with one or more example embodiments.

Detailed depictions of one or more embodiments of the inversion process 110 generally depicted in FIG. 5 are provided in FIGS. 8-14. In particular, the workflow 110a of FIG. 8 is an example of a portion of an inversion process based on a thickness search technique which is graphically depicted in FIG. 9, workflow 110b of FIG. 10 is an example of a portion of an inversion process based on an acoustic impedance search technique which is graphically depicted in FIG. 11, and workflow 110c of FIG. 12 is another example of a portion of an inversion process based on an acoustic impedance search technique which is graphically depicted in FIGS. 13 and 14. Accordingly, FIGS. 8 and 9 will be described concurrently, FIGS. 10 and 11 will be described concurrently, and FIGS. 12-14 will be described concurrently.

Moreover, it should be understood that portions or all of the workflows depicted in FIGS. 8, 10, and 12 may performed in parallel or in series in different combinations, and that other suitable workflows or techniques may also be incorporated in the inversion process 110. For instance, while the workflow 110b may be performed in the time domain, the workflow 110c may be performed in the frequency domain. Likewise, the thickness search technique in the workflow 110a may be performed in the time domain, but a suitable thickness search workflow may also be performed in the frequency domain, in some embodiments.

With this in mind, the workflow 110a of FIG. 8 represents one example of a portion of an inversion process based on a thickness search technique. The workflow 110a may involve estimating a reference waveform 100 based on an initially estimated thickness of the casing 22. For example, the thickness of the casing 22 may be known, and a thickness-based reference waveform may be provided (e.g., generated or obtained via look-up table, for example) to be compared (block 132) with the normalized waveform 96. The workflow 110a may determine (decision block 134) whether the normalized waveform 96 matches the reference waveform 100.

For example, and referring to FIG. 9, plot 146 represents a portion of the normalized waveform spectrum 96 compared with a portion of the reference waveform spectrum 100. In some embodiments, when compared (block 132) in the frequency domain, features such as the notches 150 and 152 of the two waveforms 96 and 100, respectively, the frequency difference Δf of the notches 150 and 152 may be significant, indicating that the normalized waveform 96 does not match the reference waveform 100. When the waveforms 96 and 100 do not match (block 134), the workflow 110a may involve adjusting (block 136) the previous thickness estimate to obtain a new thickness estimate $T_{new}$ 138.

For example, an equation for computing a new thickness estimate $T_{new}$ 138 is provided below:

$$T_{new} = T_0 \left(1 - \frac{2fT_0}{c}\right)^{-1},$$

where $T_0$ is the initial or previous thickness, and $\Delta f$ is the frequency difference of the two waveforms 96 and 100 and c is the sound of speed. However, any suitable algorithm or formula may be used.

$T_{new}$ 138 may then be used to generate (block 140) a new reference waveform 100, and the inversion process 110*a* may be iterative until resonance notches of the waveforms 96 and 100 match (block 134), as depicted in plot 148, where the notches 150 and 152 of the waveforms 96 and 100, respectively, are substantially matching. In some embodiments, matching waveforms 96 and 100 may also be determined based on the frequency difference $\Delta f$ being below a certain threshold. An output 142 of the workflow 110*a* may then be the thickness corresponding to the reference waveform 100 which matches with the normalized waveform 96.

As described, the workflow 110*b* of FIG. 10 is an example of a portion of an inversion process based on an acoustic impedance search technique, the principle of which is graphically depicted in FIG. 11. The acoustic impedance search technique may be based on the resonance tail of the normalized waveform 96 produced from in-casing reverberations being substantially similar to the exponential decay. The decay tail is sensitive to and reacts differently to variations in the acoustic impedances of mud and the annular fill 18, represented as $Z_m$ and $Z_a$, respectively. Therefore, in some embodiments, the decay tail of the waveform 96 may be used to estimate $Z_m$ and $Z_a$.

To estimate $Z_m$ and $Z_a$, using the workflow 110*b*, a reference waveform 100 may be produced from any suitable modeling technique and/or from a priori knowledge. Without further processing, the reference waveform 100 may substantially match the normalized waveform 96, as shown in the plot 170 of FIG. 10, which represents portions of two waveforms 96, 100 plotted in the time domain. However, to better utilize the decay tails of the waveforms 96, 100 for estimating acoustic impedance, the workflow 110*b* may involve processing the waveforms 96 and 100 in a way in which they can be compared. For example, in some embodiments, the workflow 110*b* involves computing (block 156) a logarithm of an absolute value of the Hilbert transform of the input f, represented as log (|H(f)|), of each waveform 96 and 100. Taking the log-Hilbert of the waveforms 96, 100 may allow the exponential decay of the tail to be linearly represented. The log (|H(f)|) of each waveform 96 and 100 may then be compared (block 158), as illustrated in plot 172.

If the log (|H(f)|) of each waveform 96 and 100 do not match (decision block 162), the mud acoustic impedance $Z_m$ and annular acoustic impedance $Z_a$ of the model may be adjusted (block 164) to generate (block 165) a new reference waveform 100. As represented in plot 174, increasing the mud acoustic impedance $Z_m$ may shift the amplitude of the tail while slightly decreasing its slope. Moreover, as represented in plot 176, increasing the annular acoustic impedance $Z_a$ may increase the slope of the tail, while substantially maintaining the absolute offset.

In some embodiments, a parametrization to used to describe the decaying tail of the received waveform may include a straight line drawn through the decay tail in log-Hilbert space and presented as y=kx+b. Here, a bijection $\Omega_Z \subset \mathbb{R}^2 \rightarrow \Omega_{kb} \subset \mathbb{R}^2$ may be created with respect to the following relationship:

$$[k,b] = f(Z_{mud}, Z_{cem})$$

The explicit form of $f$ may not allow for the direct determination of the inverse function $f^{-1}$ such that $$[Z_{mud}, Z_{cem}] = f^{-1}(k,b)$$

However, by presenting the reference waveform in the same log-Hilbert space a pair $[k_{syn}, b_{syn}]$ may be determined for every $[Z_{mud}, Z_{cem}]$. Fitting the pair of $[k_{syn}, b_{syn}]$ to the initial parameters $[k, b]$ the $[Z_{mud}, Z_{cem}]$ corresponding to the matching waveforms 96, 100 may be determined.

Once the waveforms 96, 100 match (decision block 162), the workflow 110*b* may produce outputs 166 of the mud acoustic impedance $Z_m$ and annular acoustic impedance $Z_a$. Accordingly, the inversion 110 in the present techniques may result in estimates of thickness (e.g., workflow 110*a*), mud acoustic impedance $Z_m$, and/or annular acoustic impedance $Z_a$ which may be more accurate than other such estimates obtained from conventional inversion or modeling techniques.

Figure 13:
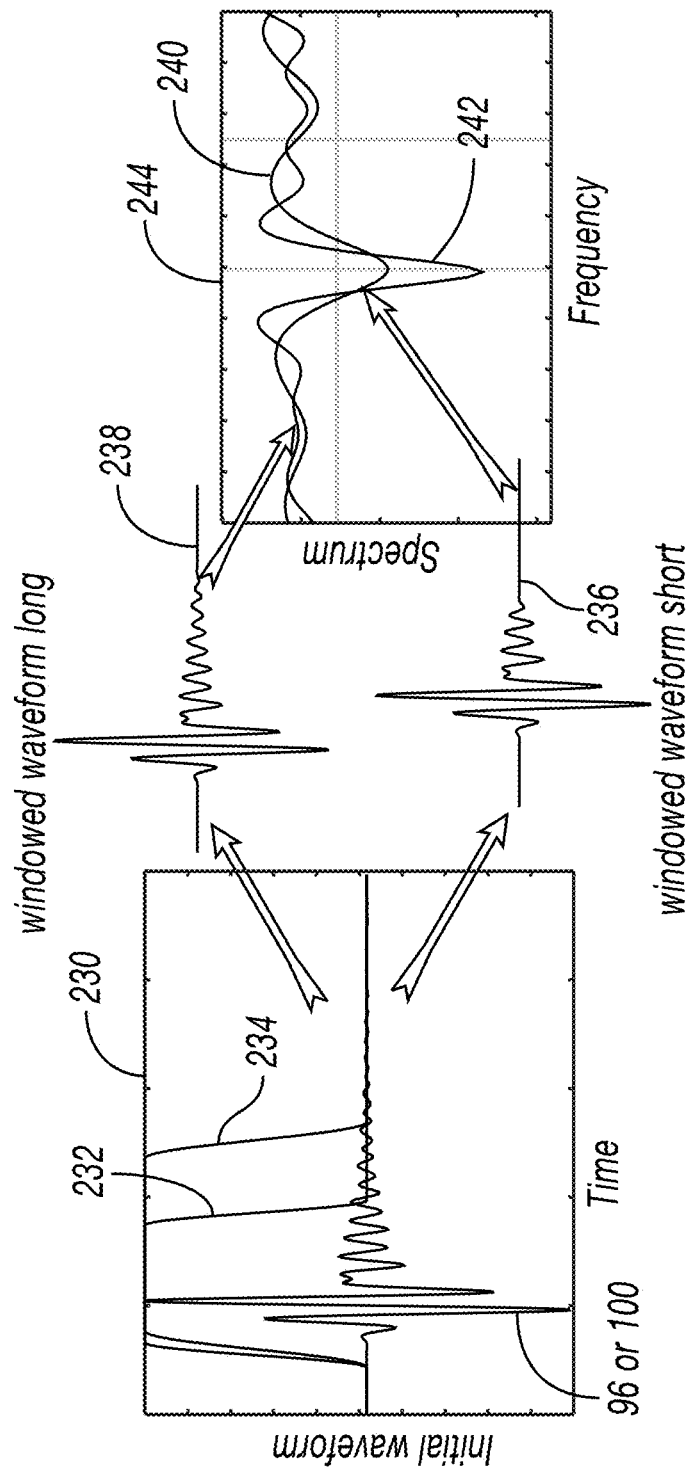
FIG. 13 is a graphical representation for explaining the workflow of FIG. 12, in accordance with one or more example embodiments.
Figure 14:
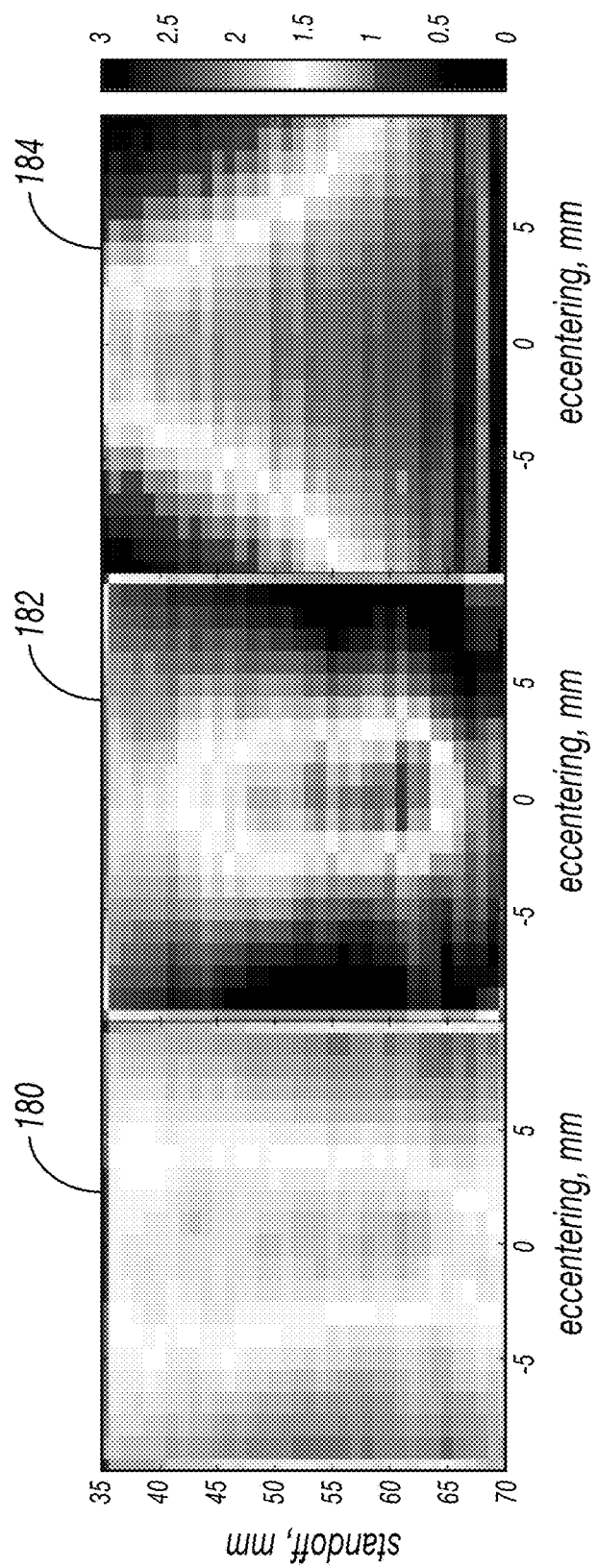
FIG. 14 is a representation of conventional inversion compared with a new inversion, in accordance with one or more example embodiments.

Furthermore, the workflow 110*c* of FIG. 12 is another example of a portion of an inversion process based on an acoustic impedance search technique which is graphically depicted in FIGS. 13 and 14. The acoustic impedance search technique may be based on comparing the normalized waveform 96 and reference waveform 100 in the frequency domain, and in particular comparing resonance frequencies of the waveforms 96, 100 in the frequency domain.

In some embodiments, the reference waveform 100 may be produced from any suitable modeling technique and/or from a priori knowledge, and/or from a look-up table or database, and may substantially match the normalized waveform 96 without much processing. However, to better compare the resonance frequencies of the waveforms 96 and 100, a time window may applied to the initial waveforms in the time domain to restrict the length of the resonating tail. For instance, in the graph 230 of FIG. 13, two time windows 232 and 234 are depicted around an initial waveform 96 or 100, resulting in corresponding windowed waveforms 236 and 238. These windowed waveforms 236 and 238 may then be transformed (block 212) to the frequency domain, as represented in graph 244, which graphs the windowed spectrums 240 and 242 of the windowed waveforms 236 and 238, respectively. In some embodiments, the same windows may be applied to both the normalized waveform 96 and the reference waveform 100, and the windowed waveforms of each of the waveforms 96 and 100 may be transformed (block 212) and compared respectively, for example, the spectrum 240 of the waveform 236 windowed by a first window 232 of the normalized waveform 96 may be compared with the spectrum of the waveform windowed by the same first window 232 of the reference waveform 100. The spectrum 242 of the waveform 238 windowed by a second window 234 of the normalized waveform 96 may be compared with the spectrum of the waveform windowed by the same second window 234 of the reference waveform 100. While some embodiments may employ two windows as is depicted in FIG. 13, in some embodiments, more than two windows may be used, and the corresponding windowed waveforms may also be compared.

The workflow 110*c* may involve fitting (block 214) the windowed spectrums around a resonant frequency to determine whether the spectrums sufficiently match (decision block 216). If the windowed spectrum of each waveform 96 and 100 do not match (decision block 216), the mud acoustic impedance $Z_m$ and annular acoustic impedance $Z_a$ of the model may be adjusted (block 218) to generate (block 220) a new reference waveform 100, or in some embodiments, a new reference waveform may be selected (block 220) from a look-up table or database based on different $Z_m$ and $Z_a$.

In some embodiments, a set of solutions may be identified due to the multiple matches in the notches and resonances in the spectrums. A best fitting spectrum may belong to a curve proportional to the relationship $Z_a=f(Z_m,\text{win\_length})$, where win_length is the same window length (e.g., 230, 232) applied to the waveforms 96 and 100. By varying the second parameter of window length, a different set of solutions may be obtained for each distinct value. A best-fit reference spectrum at a first window may be identified with respect to the corresponding normalized spectrum at the same window, and another best-fit reference spectrum at a second window may be identified with respect to the corresponding normalized spectrum at the same window.

Since the point $(Z_{a,0}, Z_{m,0})$ corresponds to the true physical solution belonging to all curves, $Z_m$ and $Z_a$ may be determined (block 222) at the intersection of curves corresponding with two or more different values of window length. The relationship below represents how to search for $Z_m$ and $Z_a$ using a system of equations:

$$\begin{cases} Z_{cem} = f(Z_{mud}, \text{win\_lengt\_1}) \\ Z_{cem} = f(Z_{mud}, \text{win\_lengt\_2}) \end{cases}$$

Accordingly, identifying (block 222) the intersection of the best fit curves at two or more windows may allow the workflow 110c to output (block 224) $Z_m$ and $Z_a$.

Example experimental results provided in FIG. 14 are from 9⅝", 12 mm thick casing immersed in a 10 ppg oil-based mud. Graph 180 represents a $Z_m$ output, and graph 182 represents a $Z_a$ output, both processed with the resonance-based inversion of the present techniques, and graph 184 represents an output processed with conventional techniques. Each of the graphs are represented with respect to eccentering and standoff. As may be interpreted from the graphs 180, 182, and 184, the resonance-based inversion techniques are largely independent of borehole fluid properly. Indeed, $Z_m$ is an output for the current resonance-based inversion technique, while it is not an output of conventional techniques. Further, the graphs 180 and 182 show better stability with respect to standoff distance compared to the graph 184. The effect of eccentricity is visible in graph 182, but this may be corrected in some embodiments by including eccentering as an input variable and matching the measured attribute (e.g., the decay line) to the reference line adjusted for tool eccentering.

Figure 15:
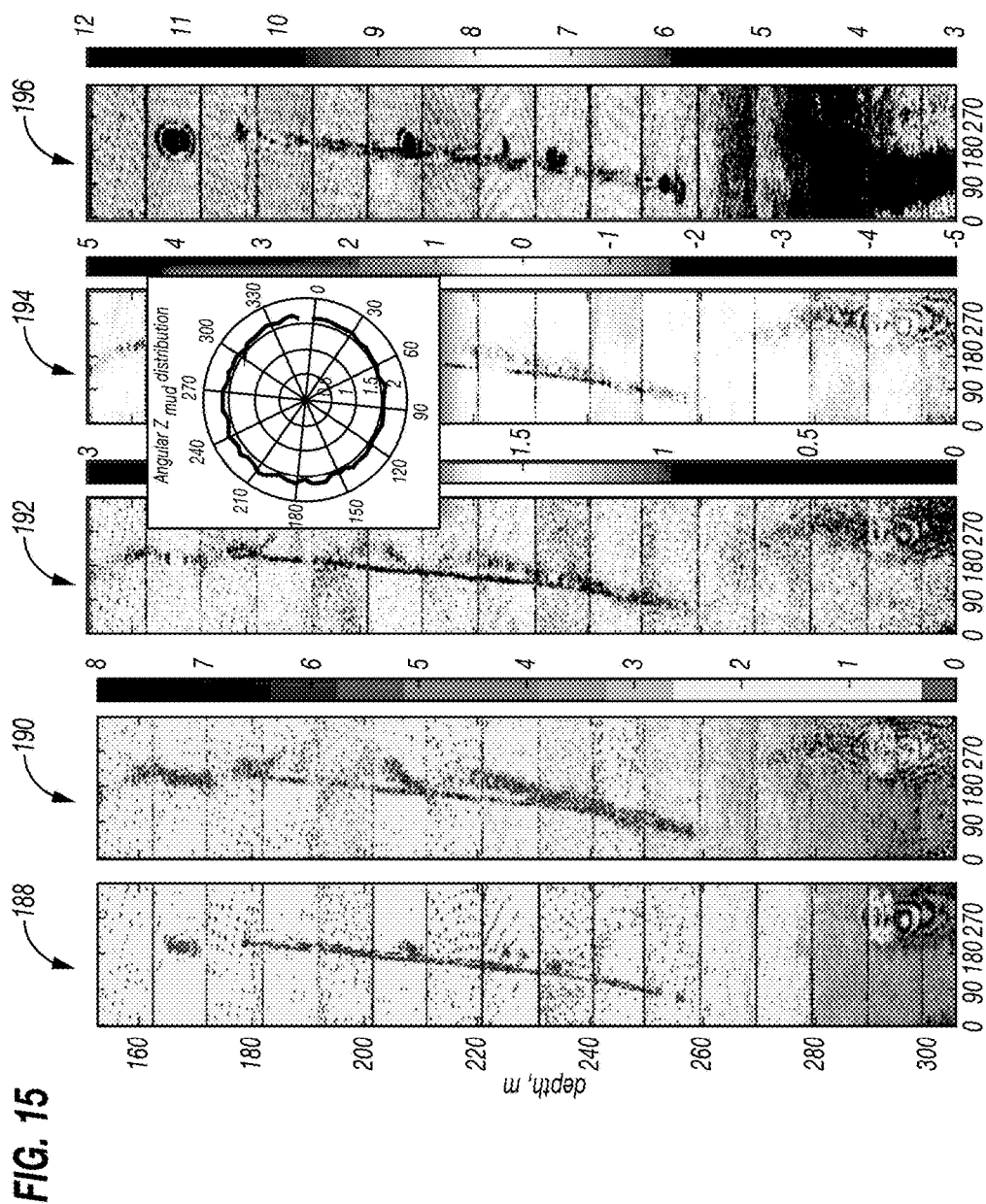
FIG. 15 is a representation of data processed conventionally compared with data processed according to the resonance-based inversion in accordance with one or more example embodiments.

FIG. 15 shows inversion results using the presently disclosed resonance-based inversion techniques compared with results obtained using other types of processing and other types of acoustic measurements. In particular, log 188 depicts $Z_a$ from a conventional pulse-echo processing technique, log 190 depicts $Z_a$ using the workflow 90 of the present techniques, log 192 depicts $Z_m$ using the workflow 90 of the present techniques, log 194 shows casing thickness estimates from both conventional techniques and the present techniques (with high similarity within about 3%), and log 196 shows an image obtained with flexural attenuation. In general, the logs 190 and 192 shows high similarity with logs 188 and 196 with log 190 in particular showing greater similarity to log 196 compared to log 188, likely due the present techniques being less sensitive to the third interface.

Figure 16:
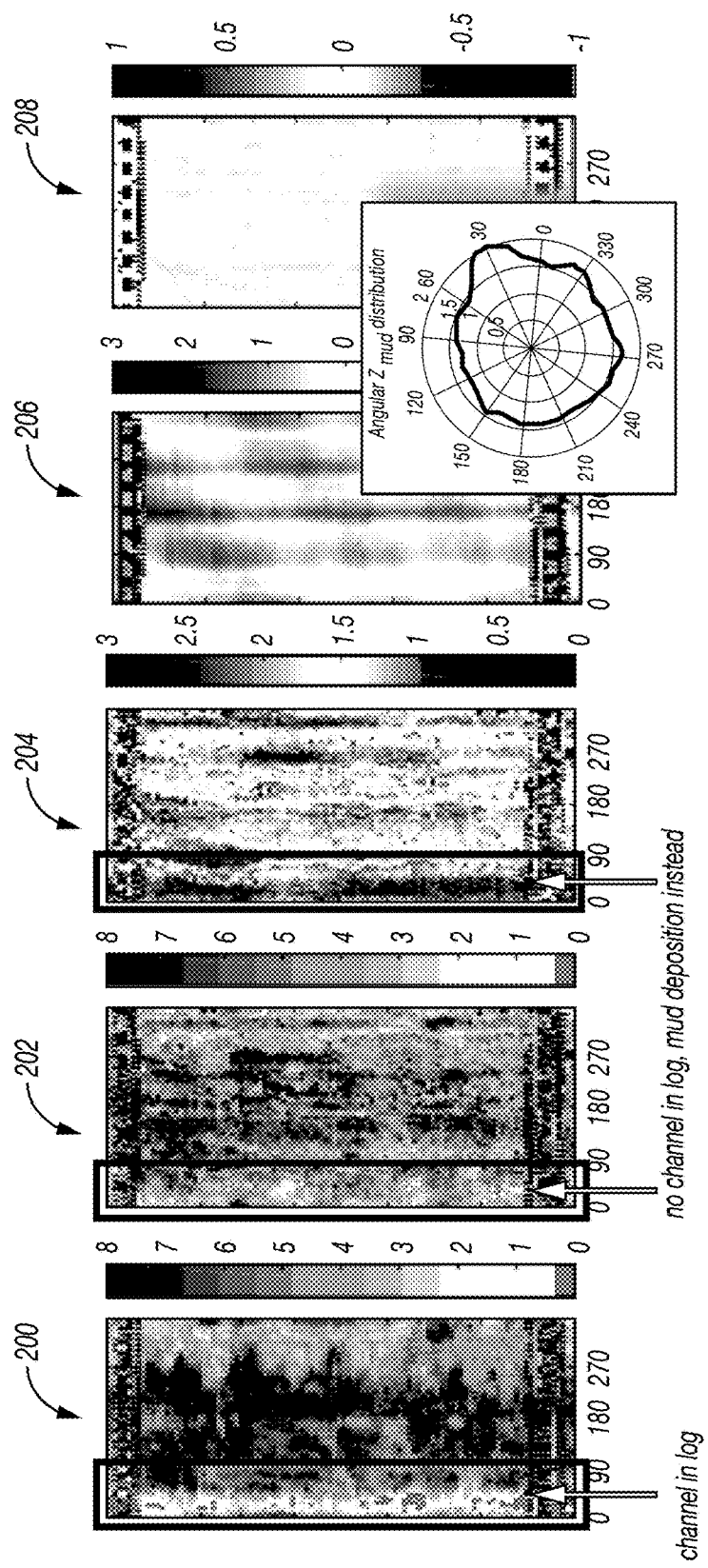
FIG. 16 is another representation of data processed conventionally compared with data processed according to the resonance-based inversion in accordance with one or more example embodiments.

FIG. 16 shows a section of a log in a deviated casing, with log 200 representing $Z_a$ using conventional processing, log 202 representing $Z_a$ using workflow 90, log 204 representing $Z_m$ using workflow 90, log 206 representing thickness using workflow 90, and log 208 representing a comparison of the thickness estimates between conventional techniques and workflow 90. Log 200 shows a clear low impedance narrow channel which is a false channel, while this channel disappears in log 202. A high impedance stripe appears instead. These log images on log 202 are consistent with the expectation that mud particles may have deposited on the low side of the casing leading to a slight increase in its acoustic impedance. As shown in the logs 200 and 202, the current inversion technique provided in the workflow 90 allows for the presence of mud deposition to be visible. Furthermore, a new log for $Z_m$ is output as in log 204.

The techniques presented herein include various components and workflows for a resonance-based inversion of acoustic data. It should be understood that the techniques and workflows discussed herein may be used in any combination, in parallel, or in any order. Moreover, other suitable processing steps known in the art may also be incorporated with the inversion techniques presented herein. Furthermore, while the parameters of casing thickness, mud acoustic impedance, and annular acoustic impedance have been described in detail as potential outputs of the present inversion workflow, the present techniques may also be used to search for other parameter outputs.

While the embodiments are described with reference to various implementations and exploitations, it will be understood that these embodiments are illustrative and that the scope of the inventive subject matter is not limited to them. Many variations, modifications, additions and improvements are possible.

Plural instances may be provided for components, operations or structures described herein as a single instance. In general, structures and functionality presented as separate components in the exemplary configurations may be implemented as a combined structure or component. Similarly, structures and functionality presented as a single component may be implemented as separate components. These and other variations, modifications, additions, and improvements may fall within the scope of the inventive subject matter.

What is claimed is:

1. A method of determining properties of a wellbore in a formation, the wellbore comprising a casing and an annular fill material between the casing and the formation and mud between the casing and an acoustic logging tool, the method comprising:

obtaining from the acoustic logging tool, acoustic data comprising one or more acoustic waves reflected from the casing, from the annular fill material, or from one or more interfaces between any of the mud, the casing, and the annular fill material, wherein the logging tool is a pulse-echo logging tool;

normalizing the one of more obtained acoustic waves using a normalization workflow, resulting in a normalized wave, wherein normalizing the acoustic wave comprises:

transforming the acoustic wave to frequency domain, resulting in a wave spectrum;

estimating a specular wave spectrum from the wave spectrum;

normalizing the wave spectrum with the specular wave spectrum, resulting in a normalized spectrum;

renormalizing the normalized spectrum with a shaping spectrum, resulting in a shaped waveform; and transforming the shaped waveform to time domain, resulting in the normalized wave;

comparing the normalized wave with a plurality of reference waves;

based on the comparison of the normalized wave with the reference wave, identifying a best-fit reference wave substantially matching the normalized wave; and determining an acoustic impedance of the annular fill material, and an acoustic impedance of mud, based on the best-fit reference wave.

2. The method of claim 1, wherein the reference wave has been normalized using the normalization workflow.

3. The method of claim 1, wherein estimating a specular wave spectrum from the wave spectrum comprises using a priori knowledge related to the wellbore.

4. The method of claim 1, further comprising:
producing the reference wave; and
iteratively producing an updated reference wave based on the comparison of the normalized wave with the reference wave until the best-fit reference wave is identified.

5. The method of claim 4, wherein producing the reference wave comprises producing the reference wave comprises using a look-up table, a database of reference waves, a reference wave generator, a model, a waveform synthesizer, or combinations thereof.

6. The method of claim 4, wherein producing the reference wave is based on known parameters of the wellbore.

7. The method of claim 1, wherein comparing the normalized wave with the reference wave comprises producing a reference wave based on an initial casing thickness estimate.

8. The method of claim 7, wherein comparing the normalized wave with the reference wave comprises iteratively adjusting a casing thickness estimate to produce the reference wave to be compared with the normalized wave.

9. The method of claim 1, further comprising:
using a model to generate the reference wave; and
taking a log-Hilbert transform of the normalized wave and the reference wave;
wherein comparing the normalized wave with the reference wave comprises comparing the log-Hilbert transformed normalized wave with the log-Hilbert transformed reference wave.

10. The method of claim 9, wherein comparing the normalized wave with the reference wave comprises iteratively adjusting a mud acoustic impedance estimate, an annular acoustic impedance estimate, or both, to produce the reference wave to be compared with the normalized wave.

11. The method of claim 1, further comprising:
applying a first window to the reference wave and the normalized wave, resulting in a first windowed reference wave and a first windowed normalized wave;
applying a second window to the reference wave and the normalized wave, resulting in a second windowed reference wave and a second windowed normalized wave;
transforming the first and second windowed reference waves and the first and second windowed normalized waves into a frequency domain, resulting in the first reference spectrum, second reference spectrum, first normalized spectrum, and second normalized spectrum;

matching the first reference spectrum with the first normalized spectrum to determine a first best fit reference spectrum;

matching the second reference spectrum with the second normalized spectrum to determine a second best fit reference spectrum; and determining the acoustic impedance of the annular fill material and the acoustic impedance of mud based on an intersection of the first reference spectrum and the second reference spectrum.

12. A non-transitory computer-readable medium storing computer-executable instructions, that when executed by at least one processor, causes the at least one processor to perform the following:

inputting, from an acoustic tool deployed in a wellbore comprising mud, casing, and annular fill, an acoustic waveform comprising one or more reflected acoustic waves, wherein the acoustic tool is a pulse-echo tool acoustic;

normalizing the acoustic waveform using a normalization workflow, resulting in a normalized wave, wherein normalizing the acoustic waveform comprises:
transforming the acoustic waveform to frequency domain, resulting in a wave spectrum;
estimating a specular wave spectrum from the wave spectrum;
normalizing the wave spectrum with the specular wave spectrum, resulting in a normalized spectrum;
renormalizing the normalized spectrum with a shaping spectrum, resulting in a shaped waveform; and
transforming the shaped waveform to time domain, resulting in the normalized wave;

producing a reference wave based on an initially estimated thickness of the casing, modeling of wellbore parameters, or combinations thereof;

comparing the normalized wave with the reference wave;
iteratively producing a new reference wave, if the normalized wave does not substantially match the reference wave;
iteratively comparing the normalized wave with the new reference wave, until the normalized wave substantially matches a matching reference wave; and
estimating an acoustic impedance of the annular fill, and an acoustic impedance of mud between the casing and the acoustic tool based on the matching reference wave.

13. The non-transitory computer-readable medium of claim 12, further storing computer-executable instructions, that when executed by at least one processor, causes the at least one processor to perform the following:
normalizing the reference wave using the normalization workflow.

14. The non-transitory computer-readable medium of claim 12, further storing computer-executable instructions, that when executed by at least one processor, causes the at least one processor to perform the following:
using a model to generate the reference wave; and
taking a log-Hilbert transform of the normalized wave and the reference wave;
wherein comparing the normalized wave with the reference wave comprises comparing the log-Hilbert transformed normalized wave with the log-Hilbert transformed reference wave.

15. The non-transitory computer-readable medium of claim 14, wherein comparing the normalized wave with the reference wave comprises iteratively adjusting a mud acoustic impedance estimate, an annular acoustic impedance estimate, or both, to produce the reference wave to be compared with the normalized wave.

16. The non-transitory computer-readable medium of claim 12, wherein producing the reference wave comprises producing the reference wave comprises using a look-up table, a database of reference waves, a reference wave generator, a model, a waveform synthesizer, or combinations thereof.

17. The non-transitory computer-readable medium of claim 2, wherein iteratively producing the new reference waveform comprises adjusting an estimated casing thickness, an estimated acoustic impedance of the annular fill, an estimated acoustic impedance of mud, or combinations thereof, to produce each new reference waveform.

* * * * *